Figure 5:
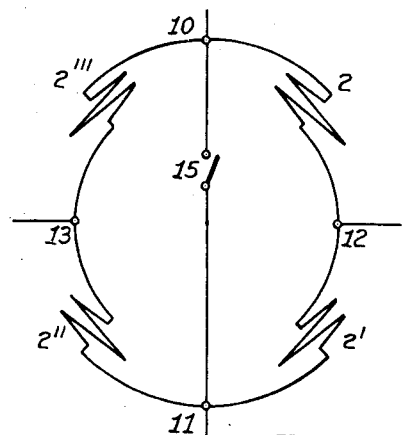

Oct. 26, 1937.　　　　　J. M. PESTARINI　　　　2,097,253
ELECTRICAL EQUIPMENT FOR ELEVATORS, HOISTS, AND THE LIKE
Filed Aug. 8, 1934　　　　2 Sheets-Sheet 1
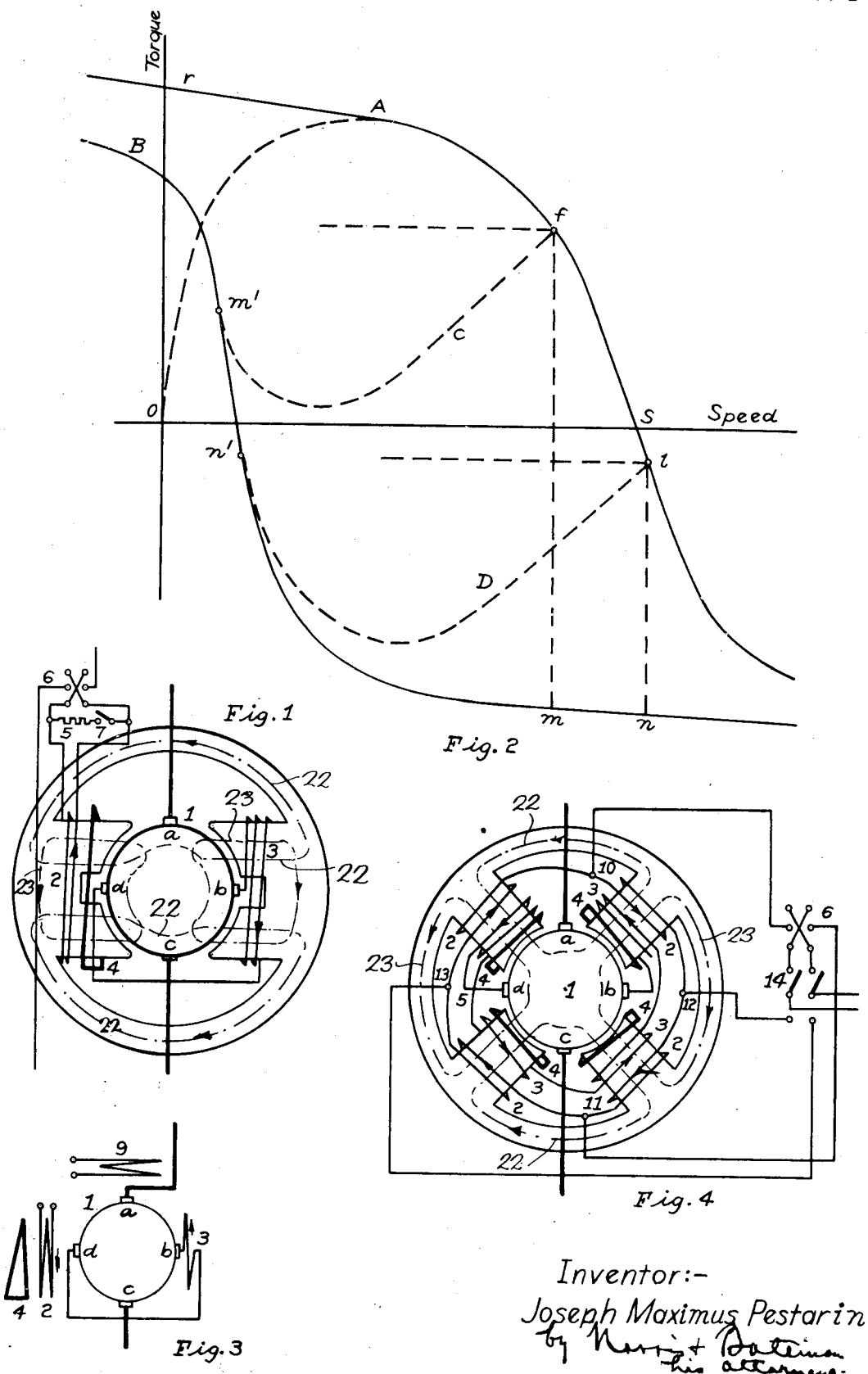
Inventor:-
Joseph Maximus Pestarini
by Norris + Bateman
his attorneys Oct. 26, 1937.   J. M. PESTARINI   2,097,253
ELECTRICAL EQUIPMENT FOR ELEVATORS, HOISTS, AND THE LIKE
Filed Aug. 8, 1934   2 Sheets-Sheet 2

Inventor:—
Joseph Maximus Pestarini

Patented Oct. 26, 1937

2,097,253

UNITED STATES PATENT OFFICE 2,097,253

ELECTRICAL EQUIPMENT FOR ELEVATORS, HOISTS, AND THE LIKE

Joseph Maximus Pestarini, Grant City, Staten Island, N. Y.

Application August 8, 1934, Serial No. 738,991
In Great Britain August 21, 1933

6 Claims. (Cl. 172—288)

This invention relates to electrically operated elevators, hoists and the like and has for its object to construct improved equipment which is operated by direct electric current of constant intensity. The equipment, object of the present invention, accomplishes the special requirements for the abovementioned applications (top speed independent from the load; stopping at the exact point; smooth acceleration and smooth braking) in a very simple way with very little switchgear, with a simple motor and a single generator for many independently operating motors.

The motor is an electric machine provided with a commutator operated by direct current of constant intensity, the flux which develops the torque being embraced by field windings so arranged as to develop, while accelerating, torque which first increases smoothly and then diminishes quickly at the approach of a given maximum speed, becomes zero at this given maximum speed and finally becoming negative, that is a braking torque, if this maximum speed be exceeded. During the decelerating period, the torque first becomes gradually a braking one, the deceleration being independent to a great extent from the load, then at a low speed the torque again becomes an accelerating one and keeps the load moving until it reaches the stop point. All these desired torque modifications occur automatically with the aid of very simple switchgear, and are obtained by providing, according to the invention, the commutator motor with a saturated magnetic circuit and with substantially three field windings: (1) a first field winding creating a constant amount of ampere turns, (2) a second field winding creating an amount of ampere turns proportional to the speed of the motor, and (3) a third field winding acting as a damper towards the flux which develops the motor torque, and arranging the ampere turns of the first and second field windings in such a way as to obtain during the acceleration period an algebraic sum of ampere turns which are substantially proportional to (or vary with) the difference of the actual speed of the motor from the arbitrarily chosen top speed; and which during the deceleration period are substantially proportional to (or vary with) the difference of the actual speed of the motor from another arbitrarily chosen adequate low speed. The second field winding may be fed by a small auxiliary dynamo driven by the main motor, or by auxiliary brushes provided on the motor itself, in case a metadyne motor is used.

The armature of the motor is supposed to be traversed by direct current of constant intensity which may be supplied, by any adequate source, a metadyne generator being preferred for its property of quick response. Only a single source of direct current of constant intensity is needed for supplying of any number of motors operating independently from one another.

The field winding of the motor, creating constant ampere turns, may be supplied either by a source of direct current at constant voltage, or by a source of direct current of constant intensity.

The metadyne here above twice mentioned is a rotating machine considered in many previous American patents; for instance in Patent No. 1,945,447; No. 1,962,030; it consists essentially of a rotor with winding and commutator as in a dynamo machine; a stator is provided which mainly affords a return path of low magnetic reluctance for the fluxes created by the rotor currents; generally the commutator carries two sets of brushes, the current traversing one set of brushes creating by its ampere turns a flux which induces an electromotive force between the brushes of the other set. One set of brushes, called primary set and traversed by a current called primary current, is generally connected to a supplying source of direct current; the other set of brushes, called secondary set and traversed by a current called secondary current, is generally connected to electrical consumers, motors or field windings, supplied with current by the metadyne. The stator of the metadyne may be provided with windings which endow the machine with the desired electromechanical characteristics. A description in detail of the metadyne principles, is given in a paper entitled "Esquisse sur la Metadyne" by J. M. Pestarini in the "Bulletin Scientifique A. I. M." No. 4, April, 1931 of "L'Association des Ingenieurs Electriciens" published by the "Institut Electrotechnique Montefiore", Liege, Belgium.

Figure 6:
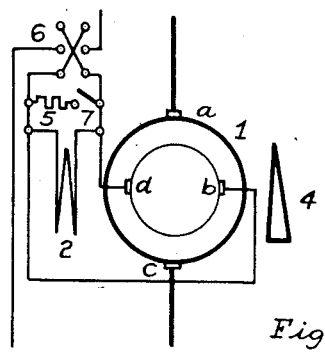
Figure 7:
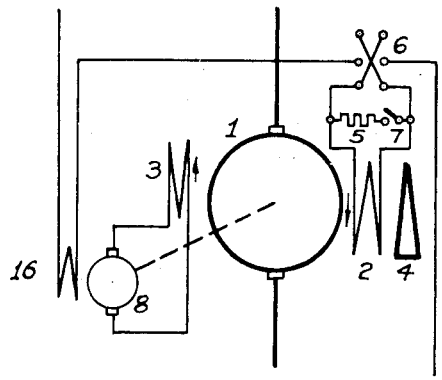
Figure 8:
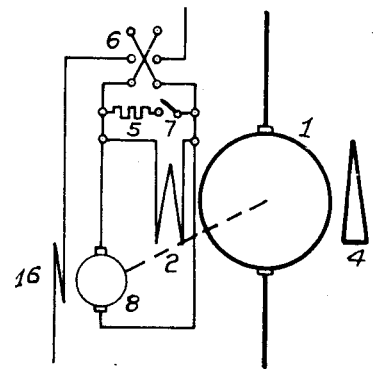
Figure 9:
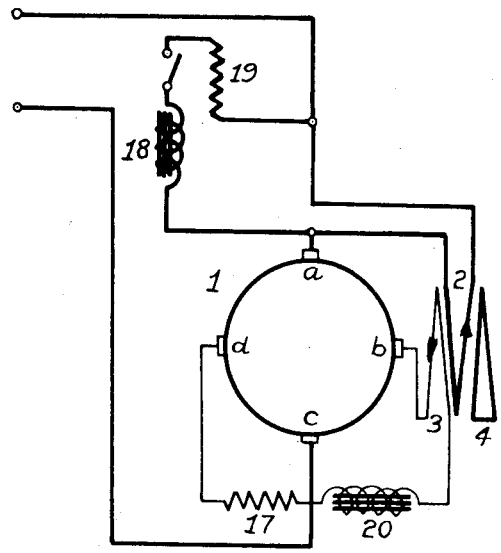

In order that the invention may be more clearly understood, reference will now be made to the accompanying drawings, where: Figure 1 gives a scheme for a motor suitable for an elevator embodying the invention; Figure 2 is a graph relating to the arrangement shown in Figure 1; Figure 3 is an improvement of Figure 1; Figure 4 shows a winding diagram of a special method of carrying out the scheme of Figure 3; Figure 5 is a further improvement in the scheme shown by Figure 4; Figure 6 is an alternative of Figure 1; Figure 7 shows a conventional dynamo as a motor with an auxiliary dynamo for the second field winding; Figure 8 shows an alternative of Figure 7; and finally Figure 9 illustrates an improvement by adjustment of the electric circuit constants.

In the arrangement shown in Figure 1, a metadyne motor 1 is indicated, the primary brushes a and c connected to a circuit, represented by thick lines and are supplied with direct current of constant intensity. The stator has only two polar segments provided with slots for the commutation under the secondary brushes b and d. The first field winding giving constant ampere turns is indicated by 2 and it is supposed to be supplied by another source of direct current of constant intensity of a lower value than the current traversing the armature, the circuit of this second source being represented by a thin line; a reversing switch 6 allows for the reversal of the direction of rotation; a key 7 is provided which connects the resistance 5 in parallel with the winding 2 and thus diminishes the ampere turns in the said winding during the deceleration period. The second field winding is represented by 3 and it is connected to the secondary brushes b and d of the metadyne. The field windings 2 and 3 are chosen in such manner that when the metadyne operates as a motor the winding 2 prevails, while when the metadyne operates as a generator, the winding 3 prevails. The third field winding acting as a damper is represented by 4. The magnetic circuit of the metadyne motor 1 is arranged to be saturated for fluxes a little greater than the normal working flux. In order to trace the path of the primary flux, it should be recalled that the primary ampere turns are created by the primary current traversing the armature through the brushes a and c and, therefore, the flux circuits of the primary fluxes follow the dash lines indicated by 23, 23 on Fig. 1. The direction of the secondary ampere-turns is on the contrary along the secondary brushes b and d, consequently the secondary fluxes follow the dash and dot line 22, 22. The operation may now be easier understood by following the diagram of Figure 2, and by supposing first that the damper winding 4 is inoperative. For starting and accelerating the key 7 is open, the ampere turns of the second field winding 3 buck the ampere turns of the first field winding 2, and their total sum decreases with the speed and becomes zero for the speed S and negative for a higher speed. Thus, owing to the iron saturation, the curve of the torque plotted against the speed will be the line A. If the elevator carries a large load the top speed will be the abscissa of the point f and if the elevator carries no load at all, the top speed will be the abscissa of the point l. The point l is negative since, the elevator being normally provided with a counterweight which balances the mean load, the machine shall have to brake in no load condition. Thus the top speed does not vary very much passing from the no load to the full load condition. When it is desired to stop the elevator, the key 7 is closed and the first field winding 2, shunted by the resistor 5, gives but a low value of ampere turns, strongly predominated by the ampere turns of the second field winding 3 when the speed is high. The curve B will then represent the torque and the working point will be at the beginning of the deceleration, at m or at n for full load and no load respectively. The speed then will decrease until it reaches a very low value corresponding to the abscissae of points m' and n' respectively very nearly the same for full load and no load conditions. From that moment the elevator will proceed at very low speed approaching the stop position where it is easily stopped by a mechanical brake without shock.

Neglecting the effect of the damper winding 4, the closing of the key 7, shifts the points of working from f and l on the curve A to the points m and n respectively on the curve B. This sudden change of torque not only would cause a very rapid initial rate of deceleration with discomfort to passengers, but the retardation by braking at the working points f and l being proportional to the lengths fm and ln respectively, would be widely different. The elevator would slow down much more rapidly in the former case than the latter. The provision of damping windings of sufficient size causes the torque to follow the curves C and D meeting the curve B at the points m' and n' respectively; these curves give a much more gradual change of torque and consequently of velocity. Moreover, it will be observed that over the first parts of the deceleration periods the curve C considered with respect to the point f as origin follows substantially the same law as the curve D considered with respect to the point l as origin. The ordinates of the curves C and D with respect to horizontal axes through f and l respectively represent the retarding torques and it will be observed that the deceleration is substantially the same whether the elevator is loaded or empty.

This damper winding will also affect the starting up characteristic, the point of working following the dotted line OA instead of jumping to maximum torque Or.

The effect of the second field winding 3 can be increased by increasing the excitation in the direction of the primary current commutation axis by the addition of a winding 9 on the stator as Figure 3 shows.

The damper winding may be constituted by a closed copper ring around the pole pieces as indicated diagrammatically in Figures 1 and 4, or by an ordinary squirrel cage in the pole face. Preferably the damper winding is a very heavy one, and it is arranged as to act upon the flux creating the torque and it is inoperative towards the flux in the direction of the commutating axis of the primary current because this flux induces the electromotive force between the secondary brushes. The disposition of the damper winding shown by Figure 1 does not give damping effect upon the primary flux of the metadyne motor, I mean the flux having the direction of the commutating axis of the primary current.

The first field winding giving a constant amount of ampere turns interlinked with the main flux and the additional stator winding giving ampere turns in the same direction as the rotor ampere turns due to the primary current, may be combined into only one winding having two different pairs of taps and acting as the first field winding or the additional winding accordingly to the pair of taps used for supplying the winding with current. Figure 4 gives a scheme embodying this arrangement. The motor metadyne 1 has four polar segments each of which is embraced by three windings, the damper winding 4, the second field winding 3 supplied with current by the secondary brushes b and d, and the winding 2 which is a combination of the first field winding, and the additional winding. (I mean a combination of the windings 2 and 9 of Figure 3. The dash lines 23 show in Fig. 4 the path of the primary fluxes, whereas the dash and dot lines 22 show the path of the secondary fluxes). When the winding 2 is fed by the taps 10 and 11, the resultant of the magnetic fields generated by the current flowing through the four sections of the winding 2 wound about the four salient poles, lies in the commutating axis of the secondary brushes, as will be easily ascertained by following the direction of said magnetic fields. But when the winding 2 is fed by the taps 12 and 13, on account of the fact that the direction of current is reversed in two diametrically opposed sections of the winding 2, the resultant of the magnetic fields lies in the commutating axis of the primary brushes. The double point double throw switch 14 operates this transition while the reversing switch 6 changes the direction of rotation. This winding with four taps may be also used as a selective damper; the winding 2 of Figure 4 has been separately reproduced on Figure 5, the four coils being represented by 2, 2', 2" and 2'''. If the taps 10 and 11 are short-circuited by the key 15 the winding acts as a selective damper of the flux having the direction of the secondary commutation axis, i. e. the direction 12—13, and it leaves unaffected the flux in the direction of the primary commutation axis, i. e. the direction 10—11. Yet the same winding may be simultaneously fed by the taps 12 and 13 and made able to give ampere turns in the direction of the unaffected flux.

Figure 7 gives the scheme of a motor consisting of conventional dynamo 1 driving a small auxiliary dynamo 8 which supplies with current the second field winding 3. The first field winding 2 and the field winding 16 of the auxiliary dynamo are shown as connected in series and supplied by an auxiliary source of direct current of constant intensity.

Figure 8 gives a similar scheme but where the windings 2 and 3 of Figure 7 have been combined into only one, the winding 2 of Figure 8. The same is to be said for Figure 6 in respect to Figure 1, the metadyne having two separate rotor windings in order to permit the combination of the two field windings into one. The circuits of the various windings may be adjusted as regard their electromagnetical inertia by means of inductances and resistances as Figure 9 shows the inductances being represented in 18 and 20 and the resistances in 17 and 19. The same scheme shows the first field winding 2 as connected in series with the primary brushes, thus requiring only one source of direct current of constant intensity.

Many modifications of the windings may be conceived by one versed in the art, or other applications may be found, yet remaining within the scope of the present invention.

Having now particularly described and ascertained the nature of my said invention, and in what manner the same is to be performed, I declare that what I claim is:

1. In an electrical equipment for elevators, hoists and the like, adapted to be operated by direct constant current, a main direct current motor having two sets of brushes, one set of main brushes being fed by direct constant current, and another set of auxiliary brushes having its commutating axis practically at 90 electrical degrees from the commutating axis of the set of main brushes, said motor having field windings so located as to have their resultant magnetic axis essentially in the direction of the commutating axis of the auxiliary brushes, and creating the field flux that gives the torque, and means comprising a resistance for feeding part of said field windings with a constant direct current of a large value while the main motor is accelerating and of a small value while the motor is decelerating, and means for connecting the other part of said field windings to the auxiliary brushes of the main motor, so as to create a number of resultant ampere turns in the said field windings which varies proportionally with the difference of the actual speed from a full load top speed while the main motor is accelerating, and so as to create a number of resultant ampere turns in the said field windings which varies proportionally with the difference of the actual speed from a no load low speed slightly different from zero, while the main motor is decelerating, and further field windings acting as strong damping circuits towards the flux of the fields which develops the torque.

2. In an electrical equipment for elevators, hoists and the like, adapted to be operated by direct constant current, a main motor having two sets of brushes, one set of main brushes being fed by direct constant current, and another set of auxiliary brushes having its commutating axis practically at 90 electrical degrees from the commutating axis of the set of the main brushes, field windings so located as to have their resultant magnetic axis essentially in the direction of the commutating axis of the auxiliary brushes, and creating the field flux that gives the torque, means for feeding part of the said field windings with a constant current of a relatively large value, while the motor is accelerating, and of a relatively small value while the motor is decelerating and means for connecting the other part of the said field windings to the auxiliary brushes of the main motor, so as to create a number of resultant ampere turns in the said field windings which varies proportionally with the difference of the actual speed from a full load top speed while the main motor is accelerating, and so as to create a number of resultant ampere turns in the said field windings which varies proportionally with the difference of the actual speed from a no load low speed slightly different from zero, while the main motor is decelerating, the above mentioned part of the field winding which is fed by direct constant current being subdivided into four members, each member embracing one polar segment of the main motor, and being provided with two pairs of taps each tap being located between the coils embracing two consecutive segments, the said winding being fed by one pair of the opposite taps, while the motor is accelerating and by the other pair of the opposite taps while the motor is decelerating.

3. In an electrical equipment for elevators, hoists, and the like, a motor of which the brushes are supplied with constant direct current, a first field winding arranged to create a constant quantity of ampere turns, a second field winding fed by a voltage varying with the speed of the motor, a damper for the flux generating the torque and means for varying the ratio between the ampere turns of the first and second mentioned field windings so as to maintain the algebraic sum of said ampere turns proportional to the difference between the actual speed and the full load top speed of the motor during acceleration and proportional to the difference between the actual speed and the no load low speed during deceleration.

4. In an electrical equipment for elevators, hoists, and the like, a motor of which the brushes are supplied with constant direct current, a first field winding arranged to create a constant quantity of ampere turns, a second field winding fed by a voltage varying with the speed of the motor and a third field winding acting as damper for the flux generating the torque, the ratio of the ampere turns between the first and second mentioned field windings being such that during acceleration the algebraic sum of said ampere turns is proportional to the difference between the actual speed and the full load top speed of the motor, a resistor and a switch for connecting across said first mentioned field winding said resistor so as to vary said ratio during deceleration in such manner that said algebraic sum of ampere turns is proportional to the difference between the actual speed and the no load low speed of the motor.

5. In an electrical equipment for elevators, hoists, and the like, a motor of which the brushes are supplied with constant direct current, a first field winding arranged to create a constant quantity of ampere turns, a second field winding fed by a voltage varying with the speed of the motor, an auxiliary generator driven by said motor and connected to supply the current to said second mentioned auxiliary winding, a third field winding acting as damper for the flux generating the torque, the ratio between the ampere turns of the first and second mentioned field windings being such that during acceleration the algebraic sum of said ampere turns is proportional to the difference between the actual speed and the full load top speed of the motor, a resistor and a switch for connecting across said first mentioned field winding said resistance so as to vary said ratio during deceleration in such manner that said algebraic sum of ampere turns is proportional to the difference between the actual speed and the no load low speed of the motor.

6. In an electric equipment for elevators, hoists, and the like, a metadyne motor of which the primary brushes are supplied with constant direct current, a first field winding arranged to create a constant quantity of ampere turns, a second field winding fed by a voltage varying with the speed, said field winding being connected across the secondary brushes of said metadyne motor, a third field winding acting as damper for the flux generating the torque, the ratio of the ampere turns between the first and second mentioned field windings being such that during acceleration the algebraic sum of said ampere turns is proportional to the difference between the actual speed and the full load top speed of the motor, a resistor and a switch for connecting across said first mentioned field winding said resistor so as to vary said ratio during deceleration in such manner that said algebraic sum of ampere turns is proportional to the difference between the actual speed and the no load low speed of the motor.

J. M. PESTARINI.